Patented Apr. 29, 1930

1,756,411

UNITED STATES PATENT OFFICE

WILLIAM B. WESCOTT, OF BOSTON, MASSACHUSETTS, ASSIGNOR TO RUBBER LATEX RESEARCH CORPORATION, OF BOSTON, MASSACHUSETTS, A CORPORATION OF MASSACHUSETTS

DRY MOLDING

No Drawing.   Application filed December 10, 1927.   Serial No. 239,215.

This invention relates to improvements in dry molding; and it comprises a method of obtaining rubber compositions in granular, vermiform, cordiform, shredded or other divided condition adapted for assemblage in a mold and of molding to the shape desired with subsequent curing wherein granular fillers. short cords or fibrous masses are treated with a small amount of properly diluted commercial latex containing some proteid protective colloid, such as hemoglobin, to obviate coagulation and also to obviate subsequent stickiness after drying, there being advantageously also an addition of zinc oxid, the treated material is dried to form an agglomerated mass and the mass is then comminuted or shredded to put it in divided form suitable for the stated dry molding operation; and it also comprises certain products of said method; all as more fully hereinafter set forth and as claimed.

In the rubber art it is a desideratum to produce a fine particled form of rubber-containing materials, such as a dry granular or loose fibrous rubber-containing material, which may be kept and stored and be conveniently assembled in weighed or measured amounts and directly molded into shape under heat and pressure in the usual way of vulcanizing. For various reasons, no very practical method of obtaining this result has been provided in the art. For one thing, such a material would expose large areas of rubber to air and it is thought by those familiar with the rubber art that rubber so exposed on storage may undergo undue oxidation. By the present invention however I am able to provide such a loose small grained or small particled material and I have found the presumed liability to deterioration on exposure to air to have no validity. The present invention is particularly applicable to making hard compacted articles from loose granular or fibrous materials, the final article, in the case of asbestos, consisting of asbestos fiber with a small amount of well-distributed rubber bonding the fibers together; this rubber being either soft cured or hard cured. In this invention, I use latex as a source of much, most, or all of the bonding rubber. Similarly, hard and compact articles can be made from bulk loose cord containing material; or from a granulated or pulveriform composition of rubber and granular material. The present invention is particularly useful where the proportion of rubber is low.

Because of costs and for other reasons, it is sometimes desirable to make articles of asbestos, with or without other mineral matters, carrying as little as 6 to 8 per cent of rubber. This amount, if properly distributed, is sufficient for bond. It is impractical by present day processes however to incorporate more than about 35 to 40 per cent of asbestos into a rubber composition without using a rubber softener. It is, however, possible by the use of certain expedients to get these low proportions of rubber into an asbestos composition by the aid of diluted latex. Commercial latex is at once coagulated by commercial asbestos, which prevents intimate incorporation of the two in the way here desired. The asbestos may be freed of this coagulative property by extracting with acid and washing; but even so, the mechanical manipulation incident to working together large amounts of asbestos and small amounts of latex may, again, produce coagulation. This can be avoided by the use of a protective colloid.

A further difficulty, however, develops in the molding of this composition, since a mixture of asbestos and latex containing only 6 to 8 per cent rubber is apt to dry to a rock-like hardness and to shrink and warp. In some cases, the pressure required to obliterate voids and make a compact properly contoured final article from the materials resulting from drying, is of an order of magnitude much greater than is usual in rubber processes. Often, there is a compression factor of 3:1 to 1.5:1. But I have found these hard masses may be readily broken down to granular or powder form and be then molded into shape with no more pressure than is usual in the rubber art. The dry mass breaks down readily with suitable apparatus. In breaking down, I find it better to use a shredding device, effecting disintegration by a toothed arrangement adapted to pull the material apart. Crushers or grinders, involving impact disintegration, are not so suitable. While the dry slabs are often so hard as to be resonant, they are quite porous; the rubber-carrying fibers being to a great extent separated by voids left in evaporation of water from the dilute latex used.

The fineness of disintegration desirable is determined partly by the original length of fiber and partly by the degree of flow needed in molding. Thick walled products can be satisfactorily made from rather coarse granules; while, for thin walled products, such as battery boxes and the like, the granules should be relatively fine. Sometimes I granulate and then separate different size grains, using each fraction for special purposes. Very fine material, I sometimes remove by sifting and use as such or return to another wet batch.

In drying the slabs, I try not to have the temperature exceed 150° F. and I employ conditioned air. In drying, the moisture left should be less than the normal water of condition of any hygroscopic materials which may be present. It is sometimes convenient to effect a final complete drying of the granulated material by tumbling in a rotary drum in a current of conditioned air. This yields a loose granular material ready for molding. Sometimes, however, I wet-mold my mixture into slabs, completely dry these slabs and keep the material in slab form until it is wanted for use, granulating just before use. This has the convenience that the slabs may be put into stock and only granulated when wanted, thereby shortening the time during which the material is held in granular form exposed to the air.

In drying the slabs, the degree of porosity naturally influences the drying time considerably. For example, for making 2-inch paving blocks, the equivalent material, in the slab form, may be made occupying 3 times this volume, i. e., as a 6-inch slab. This will ordinarily require a drying period of about 48 hours, at about 150° F. in conditioned air of 20 per cent humidity, while the same amount of material in the form of a 4-inch slab will require nearly double the drying time. But if the slabs be dried on warm shelves in vacuo, the drying times will be reversed, because of the better heat conductivity of the less porous block. Equal drying may be effected in about half the time by the use of vacuum rather than of conditioned air, but the expense is higher.

As so far stated, the final articles being produced by simple drying have a bond of gelled rubber, which I regard as more advantageous than a bond of coagulated rubber. However, when coagulated rubber is desired it can be obtained by the expedient of limiting the amount of protective colloid present, so that the rubber of the latex slowly coagulates during the various operations. Even so, however, there is the disadvantage that the reticulate nature of any coagulum, however fine the coagula, tends to localize the resulting rubber more or less into specks or nodules, rather than the thin fiber coating films here desirable. With this localization, more rubber is needed to effect bond. Coagulation rubber is better adapted for articles containing much more rubber; say, 25 to 45 per cent, or more.

What has been said regarding asbestos applies also to composition made with granular mineral fillers, such as zinc oxid, whiting, talc, etc. It also applies, with some modification, to the manufacture of compact and dense articles with the aid of short cords and threads; for example, the cords coming from the comminution of old tire stock. Cords treated with diluted latex do not dry down to rocky products; and there is no great difficulty in compressing the agglomerated dried material, as it comes from the drier in rough molded form, to the final shape and density required. Nevertheless, it is convenient, and I regard it as within the present invention, to produce a fine fibrous material in loose dry form which can be used by weight or measure to make individually molded shapes.

As stated, in the production of molded shapes from asbestos under the present invention, it is desirable to have a protective colloid present to prevent or hinder coagulation; and as this colloid, I find hemoglobin the most advantageous. Pure vegetable fiber, such as cotton cords, does not coagulate ammoniacal latex, but, on the other hand, reclaimed cord from old tires does have a coagulative influence, because of the presence of particles of rubber. Hemoglobin is therefore advantageous in using tire scrap for this reason; and it is also advantageous, even with clean cotton, in that it prevents stickiness or tackiness of the dry fiber, thereby much facilitating shredding, and assemblage. Commercial latex often contains a "creamy" portion consisting of finely divided coagula particles and these are filtered out by the cotton threads and form an exterior sticky layer. The presence of hemoglobin obviates this tackiness, even with poor latex.

While other protective colloids may be used in lieu of hemoglobin, hemoglobin has the advantage that in a particular dry condition, it is cured by heats and pressures like those used in vulcanizing rubber, and its use therefore contributes to the final bond.

In using latex on cords, the non-creamy, or normal, portion of the latex enters the capillaries and produces a rubber impregnation throughout. Sometimes, impregnation in this sense is not wanted and in this case, the cords need not be impregnated with the rubber; they may simply receive a firmly adhering coating. In so doing, I use another expedient, which is to add a certain amount (about 5 per cent on the rubber) of zinc oxid to the mixture of latex and hemoglobin and then agitate the mixture briskly or heat it to 75 to 100° F. In either event, a peculiar reaction takes place between the hemoglobin and the zinc oxid in the composite mixture, whereby the whole mixture is converted into a batter-like mass containing the latex in its original uncoagulated form; see copending application Serial No. 235,754, filed November 25, 1927, which issued as Patent 1,690,150 on November 6, 1928. On now mixing short cords with this batter, the cords are coated but are not permeated to any extent; not more than is necessary to give a permanent bond between the coating rubber and the cord. Cords thus treated can be dried while tumbling to yield a loose product or on shelves, conveyors or the like to yield readily shredded agglomerates; these agglomerates being useful in the same way as before stated; viz, suitable quantities of the material after shredding may be assembled in the mold and cured under heat and pressure to form integral masses.

Intermediate conditions between complete impregnation of the cords by latex and superficial penetration can be attained by suitable adjustment of the hemoglobin-zinc oxid reaction. The addition of zinc oxid may, for example, be postponed till the diluted protected latex has effected some penetration and then zinc oxid stirred in and the mass thickened; or, with zinc oxid in the original mixture, quiet diffusion may be allowed to go forward for a time and then the mass forcibly agitated or warmed to 90 to 125° F. In either event, the mass quickly thickens and capillary penetration of rubber ceases.

In any embodiment of my invention described, the right amount of sulfur for the degree of vulcanization desired may be mixed with the materials initially. In the presence of hemoglobin there is no difficulty in stirring sulfur into latex and securing uniform, permanent dispersion. In the absence of the hemoglobin, this incorporation of sulfur is a matter of some difficulty. With the sulfur may be added such vulcanization accelerators as may be desired.

In one typical embodiment of the present invention, making a hard molded switchboard panel with the aid of asbestos, latex, hemoglobin and zinc oxid, I produced a final material containing about 60 per cent short fiber asbestos and 40 per cent of other materials. The amount of rubber in the bond was 8 per cent. In making this composition, 3 parts of hemoglobin (3 per cent of the final mixture) were dissolved in sufficient dilute latex to correspond to 8 parts of rubber. To the liquid was added 3.2 parts sulfur. In the presence of the hemoglobin, this sulfur was easily dispersed throughout the liquid. There were further added to the liquid a filler composed of 4.8 parts of litharge, 6 parts zinc oxid, 4.8 parts bauxite, 8 parts barytes and 5.2 parts whiting. The zinc oxid was present partly as a filler and partly for the described purpose. The mixture, so far, was a sort of magma from which the latex, colored red by hemoglobin, tended to separate. It was vigorously stirred and was warmed to about 100° F., whereupon it assumed a batter-like consistency, by the reaction between hemoglobin and zinc oxid. I diluted the batter somewhat with water and stirred in the 60 parts of short fiber asbestos. Dilution of the batter was to give the volume that would be readily held by the asbestos. At this stage, there was no cohesion among the asbestos fibers, nor were they in any way tacky. There was no coagulation of the latex, nor was there any settling out of the heavy litharge. The mixture, because of the presence of the latex and hemoglobin, was more or less frothy, but this was advantageous as making the resultant dry composition more porous. The wet mass was placed in tray molds to form slabs and these slabs dried on wire gauze shelves in a suitable drier, the temperature not being allowed to go above 150° F. and the entering air being conditioned to about 20 per cent relative humidity. The resulting dry slabs were shredded and granulated. A charge of granulated material was put into a plunger type mold, where it was given a 3:1 compression to form slabs adapted for switchboard panels. Compression was at a temperature somewhat above the melting point of sulfur and the pressure was about 2 tons per square inch, exerted for a few seconds. This completely eliminated the voids. Final curing was in an open type mold. The procedure, as so far described, gave a slab of whitish appearance, because of the great quantity of asbestos and white filler present. In making black surfaced switchboard paneling, the operation was in the same way, save that in the plunger mold was first placed a thin layer of a composition made in the same way but carrying somewhat more rubber. The rest of the mold was filled with the composition described. On applying pressure, the facing layer became unitary with the body layer. Other materials, such as synthetic resin compounds, may be used in the same way for facing layers.

The tensile strength of the composition made in the proportions indicated was 2025 pounds per square inch in using coarse granules; those passing a 10 mesh screen and caught on a 20 mesh screen. The material obtained with finer granules gave higher tensile strengths, when molded in the same way. Products having tensile strengths between 3500 and 4000 pounds per square inch were obtained from a similar composition in which however most of the fine filler was omitted.

Zinc oxid however was used to exert its specific action on the hemoglobin. One typical composition was made with 94 parts of asbestos and 6 parts of a composition carrying rubber, hemoglobin and sulfur in the ratio of 70:30:6, together with a small amount of zinc oxid and litharge. Another similar composition carried 89 parts asbestos and 11 parts of rubber, hemoglobin and sulfur in the ratio 95:5:6. This particular composition carried no zinc oxid, but I have found that, on the whole, the presence of zinc oxid and the products of the stated reaction between zinc oxid and hemoglobin are desirable. Incorporation of filler and latex becomes much more convenient and the tensile strengths are ordinarily greater.

Using granules passing a No. 20 screen, the product obtained in the plunger press is smooth, has a high gloss, has very good tensile strengths, and has high dielectric properties.

In making molded plastics with asbestos under the present invention, the low limit for rubber in the bond is between 5 and 7 per cent. With cotton fiber, the low limit is somewhat higher, being usually between 10 and 12 per cent of rubber by weight.

When treating cords to obtain a surface coating of rubber but without penetration beyond that necessary to yield a good anchorage, it is sometimes expedient to previously treat the cords with a coagulant. The coagulation of latex as it contacts with the surface fibers prevents further penetration but these fibers are surrounded and embedded in the coagulum. The rubber in contact with the fibers is coagulated rubber, while the balance of the coating may be either a coagulum or a gel depending on the amount of coagulent present. As stated, however, I prefer to use thickened latex to control penetrability and obtain a gel rubber coating rather than a coagulum.

Materials made under the present invention in molding seem to have no tendency to entrap air, as is usually the case when pieces of milled rubber stock are assembled in a mold. In molding shapes from loose cords, prepared by the method of the present invention, the flow of material in the preliminary compression mold is very good.

The granulated material, when hemoglobin is used, is much less susceptible to oxidation than ordinary rubber compounds and, when the fibers are tumbled during drying or otherwise produced in a loose state, so that there is little or no tearing of the rubber coating in the shredding operation, the hemoglobin seems to function as a protective against oxidation.

The term latex, as herein used, comprehends any aqueous suspension of minute rubber particles, whether artificially prepared or as derived from any of the rubber yielding trees and whether in its natural aqueous vehicle or in an artificial serum.

What I claim is:

1. A method of making rubber compositions which comprises admixing a quantity of filler with fluid latex, drying such mixture to provide an agglomerated porous mass of intimately distributed rubber and filler, subsequently finely dividing the mass, shaping the finely divided material into form under pressure and vulcanizing the shaped mass.

2. A method of making rubber compositions which comprises admixing a quantity of filler with fluid latex containing a protective colloid, drying such mixture to provide an agglomerated porous mass of intimately distributed rubber and filler, subsequently finely dividing the finely divided material into form, shaping the mass under pressure and vulcanizing the shaped mass.

3. In the manufacture of rubber articles, the process which comprises compounding a mass of fillers including fibers with latex, subsequently drying the compounded mixture to convert it into an agglomerated mass carrying gelled latex on the fiber, subdividing the agglomerated material to obtain a mass of loose fibrous material, shaping a portion of such loose fibrous material into a desired form and vulcanizing under heat and pressure.

4. In the manufacture of rubber articles, the process which comprises compounding a mass of fillers including fibers with preserved latex, admixing with the latex ingredients to prevent tackiness of the subsequently dried material, drying the compounded mass to form an agglomertated body, dividing the dried material into loose fibers carrying rubber derived from the latex, said fibers being non-tacky, shaping the divided fibers into the desired form and thereafter vulcanizing with the aid of heat and pressure.

5. In the manufacture of rubber articles, the process which comprises compounding a mass of fibrous fillers with latex containing hemoglobin in sufficient quantity to prevent coagulation of the latex and to render the subsequently dried material non-tacky, drying the compounded mass, dividing the dried material into small portions, shaping the divided portions into the desired form, and vulcanizing.

6. In the manufacture of rubber articles, the process which comprises compounding a mass of fillers with an aqueous dispersion of rubber containing the reaction products of hemoglobin and zinc oxid, drying the compounded mass, dividing the dried material into small portions, shaping the divided portions into the desired form and vulcanizing.

7. In the manufacture of rubber articles, the process which comprises compounding a mass of asbestos fibers with an aqueous dispersion of rubber, drying the compounded mass, dividing the dried material into small portions of asbestos fiber containing rubber, shaping the divided material into the desired form and vulcanizing.

8. A method of making rubber compositions which comprises admixing a quantity of asbestos fibers with fluid latex containing a protective colloid, roughly shaping the wet mixture, drying the mix to a hard consistency, finely dividing the dried material in the absence of excessive pressure, and shaping and vulcanizing the divided particles.

9. A method of making rubber compositions which comprises admixing a quantity of asbestos fibers with fluid latex in an amount insufficient to give more than 25 per cent of bonding rubber in the final article, roughly shaping the mixture and drying the same to a hard consistency, tearing the material so obtained into shreds, shaping the shreds and vulcanizing the shape.

10. A method of making rubber compositions which comprises admixing a quantity of fibers with fluid latex in the presence of a coagulable protective colloid and vulcanizing agents, drying the wet mixture at a temperature below the coagulation point of such colloid to form an agglomerated material, shredding the dried material, molding the divided material and vulcanizing.

11. A method of making rubber compositions which comprises admixing a quantity of fibers with fluid latex containing a protective colloid, drying the wet mixture in an atmosphere having a temperature between 140° and 150° F. and a relative humidity of about 20 per cent, finely dividing the dried mass, and vulcanizing the same with the aid of heat and pressure.

12. A method of making rubber compositions which comprises admixing a quantity of fluid latex with more than 50 per cent of hardening filler as calculated on the rubber content of the latex, including in the mixture a quantity of protective colloid and vulcanizing agents and drying the mass in an atmosphere of predetermined humidity to form an agglomerated material which is hard and porous and which contains gelled rubber intimately distributed throughout the mass of fibers and which is substantially non-tacky.

13. As a new material for producing molded rubber articles, a mass of loose non-tacky shredded particles containing rubber from latex gelled in situ.

14. As a new composition of matter for producing molded rubber articles, a mass of loose shredded fibers carrying rubber from latex gelled in situ.

15. As a new composition of matter for producing molded rubber articles, a mass of loose shredded fiber coated and impregnated with non-tacky rubber.

16. As a new composition of matter for producing molded rubber articles, a mass of loose shredded asbestos fibers coated with unvulcanized non-tacky rubber from latex gelled in situ.

In testimony whereof, I have hereunto affixed my signature.

WILLIAM B. WESCOTT.